No. 635,102. Patented Oct. 17, 1899.
H. A. VON KRETSCHMAR & J. VOLLMER.
TELESCOPE ATTACHMENT FOR GUNS.
(Application filed Aug. 15, 1899.)
(No Model.) 2 Sheets—Sheet 1.
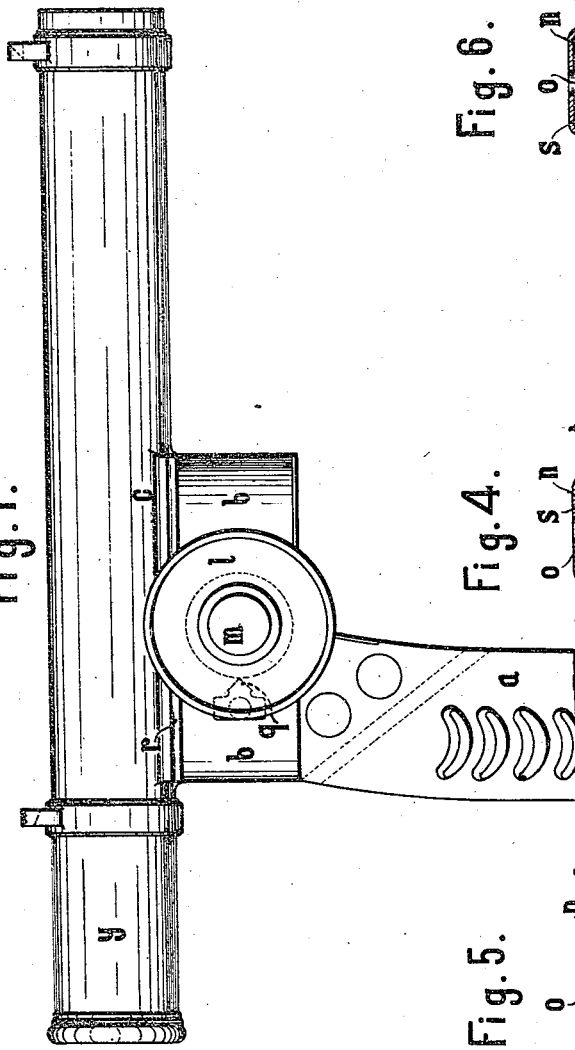
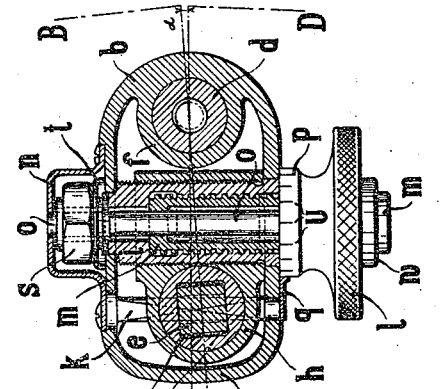
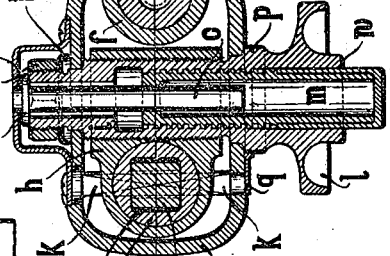
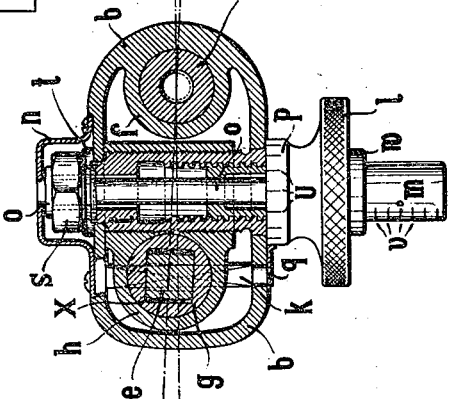
Witnesses:
G. W. Eisenbaum
C. P. Hendrickson.
Inventors:
Hans A. von Kretschmar
John Vollmer
by A. Faberduhurst
Attorney.

No. 635,102. Patented Oct. 17, 1899.
H. A. VON KRETSCHMAR & J. VOLLMER.
TELESCOPE ATTACHMENT FOR GUNS.
(Application filed Aug. 15, 1899.)
(No Model.) 2 Sheets—Sheet 2.
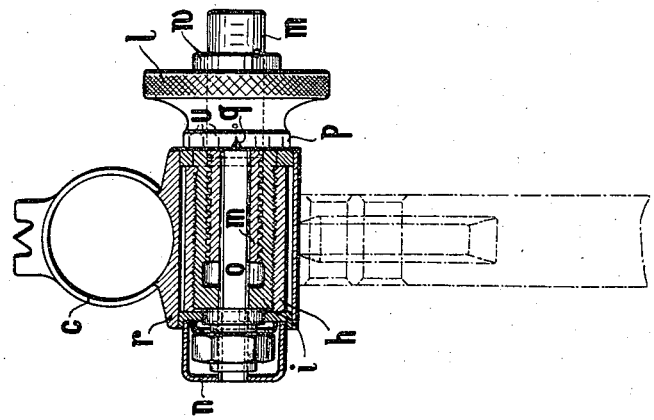
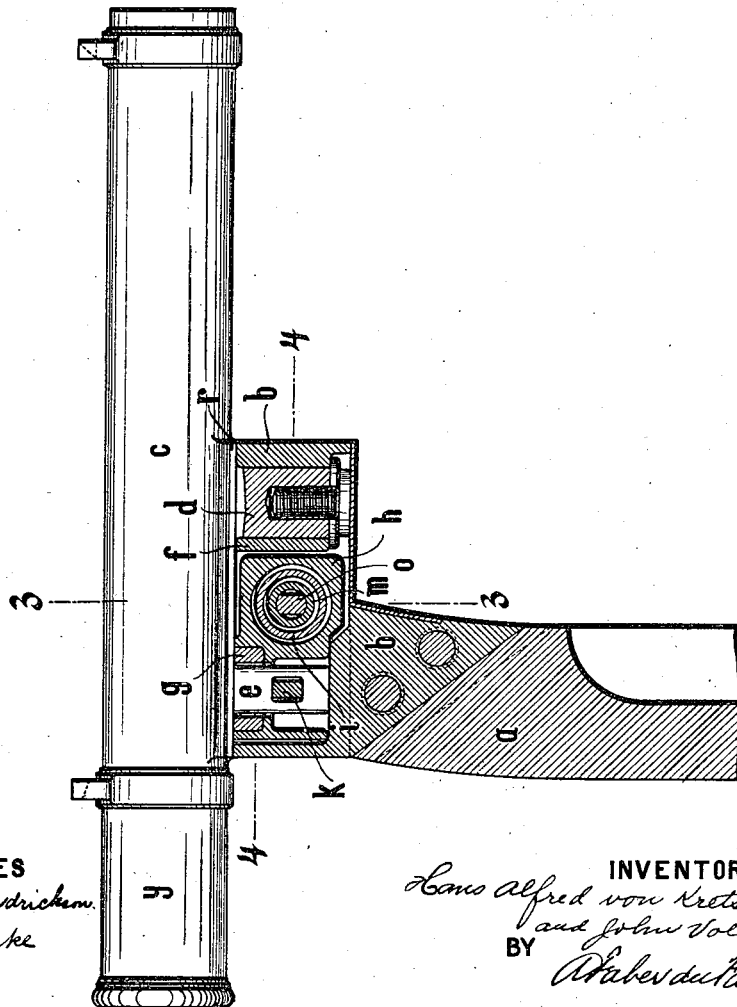
WITNESSES
Eugenie P. Hendrickson.
L. B. Bloemeke
INVENTORS:
Hans Alfred von Kretschmar,
and John Vollmer,
BY
ATTORNEY

UNITED STATES PATENT OFFICE.

HANS ALFRED VON KRETSCHMAR AND JOHN VOLLMER, OF ESSEN, GERMANY, ASSIGNORS TO FRIED. KRUPP, OF SAME PLACE.

TELESCOPE ATTACHMENT FOR GUNS.

SPECIFICATION forming part of Letters Patent No. 635,102, dated October 17, 1899.

Application filed August 15, 1899. Serial No. 727,290. (No model.)

*To all whom it may concern:*

Be it known that we, HANS ALFRED VON KRETSCHMAR and JOHN VOLLMER, citizens of the German Empire, residing at Essen, Germany, have invented certain new and useful Improvements in Telescope Attachments for Guns, of which the following is a specification.

This invention refers to a telescope attachment for guns, its object being to arrange the connection between the telescope and the gun in such a manner that the parts serving for the lateral adjustment of the telescope are protected in the best possible manner against the action of firing and that wear of the movable or adjusting parts is prevented to the greatest possible extent. By this means accuracy of adjustment is permanently insured. Furthermore, an arrangement is made which facilitates the readings of the lateral direction of the telescope.

The invention will be best understood by reference to the annexed drawings, in which—

Figure 1 represents a side view of the upper part of the telescope attachment. Fig. 2 is a longitudinal vertical section of Fig. 1, the telescope being shown in elevation. Fig. 3 is a cross-section on the line 3 3, Fig. 2. Fig. 4 is a horizontal section on the line 4 4, Fig. 2, with the several parts of the telescope in the central position. Figs. 5 and 6 are horizontal sections, partly in elevation, on substantially the same line as Fig. 4, but illustrating different angular positions of the telescope.

Similar letters of reference designate corresponding parts throughout the several views of the drawings.

Referring to the drawings, the letter $a$ designates the supporting-bar, adjustably secured to or connected with the gun-barrel in a usual manner.

$b$ is the box-shaped head of the supporting-rod $a$, which carries the telescope $y$ and is provided with or contains the mechanism for effecting the lateral adjustment of the telescope and for reading off. The telescope $y$ is placed within a protecting-casing $c$, which is provided with rear and front sights for approximate adjustment vertically and laterally or horizontally and with a flat foot $r$, which covers the open top of the head $b$. Said casing is also provided with two pins $d$ and $e$, of which the pin $d$ is of cylindrical form and is adapted to turn within a socket $f$ formed within the head $b$, so that the telescope can be swiveled or adjusted horizontally or laterally about its axis, while the pin $e$ is of rectangular cross-section and forms the connection between the telescope and the adjusting mechanism for the same. This adjusting mechanism consists of a hollow spindle $i$ and a nut $h$. The spindle $i$ is journaled at both ends within the head $b$ and is held in its position by a nut $s$, having an interposed spring-washer $t$. The said spindle is adapted to be turned by a usual knob or handle $l$. The collar $p$ of the spindle is provided with graduations or marks $u$ for the purpose of reading off the angle of turning with respect to a fixed index-mark $q$ on the head $b$. For the purpose of reading off full turns the spindle $i$ is provided with an internal thread engaged by a threaded hollow spindle $m$. A guide-bolt $o$ of square or other polygonal cross-section is held against turning by the cover $n$ surrounding the nut $s$, and said bolt projects through the hollow spindle $i$ and through a corresponding hole in the end of the hollow spindle $m$ and prevents turning of the spindle $m$. In view of this construction it follows that when the spindle $i$ is turned a longitudinal displacement of the spindle $m$ on the bolt $o$ is effected. The extent or magnitude of this displacement can be read off on the divisions or graduations $v$ on the cylindrical surface of the spindle $m$ exterior to the casing. The annular surface $w$ of the knob or handle $l$ serves as an index for such reading. For convenience the graduation is so made as to indicate full turns or revolutions of the spindle $i$. The nut $h$ of the spindle $i$ is guided in a straight line by a bolt $k$ of substantially rectangular or like cross-section, which said bolt also takes up the impulse due to firing, so as to relieve the fine threads of the spindle $i$ and nut $h$. For further relieving the spindle and nut some slight changes may be made in the detail, such as the arrangement of a second guide-bolt on the side of the nut $h$ facing the pin $d$. For transmitting the rectilinear motion of the nut $h$ to the pin $e$, which is guided in the arc of a circle, a bush $g$ is pivoted within a cylindrical bearing formed in the nut $h$, and said bush is provided with a slot $x$, within which the two faces of the pin $e$ parallel to the longitudinal axis of the telescope are firmly guided, while movement in the direction of the longitudinal axis of the telescope is permitted in view of the slot being longer than the width of the pin $e$ in that direction. The slot $x$ permits the pin $e$ to move in the arc of a circle within certain limits. The bolt $k$ (previously referred to) passes through an opening in the pin $e$, sufficient lateral play being allowed, but vertical play being prevented by the bolt fitting against the top and bottom of said opening, thus forming a firm guide, by means of which the impulse due to recoil is transmitted to the head $b$.

In Figs. 4, 5, and 6 the normal or central position of the telescope is designated by the line C D, and the extreme positions of the axis of the telescope to the right and left of the central position are designated by the lines A B in Figs. 5 and 6, respectively.

The telescope is operated as follows: In the normal position of the telescope the several parts are in the positions shown in Fig. 4. For lateral adjustment of the telescope the knob or handle $l$ of the spindle $i$ is turned to the right or left, whereby the nut $h$ is displaced correspondingly in the direction of the axis of the spindle $i$. During this displacement the pin $e$ is carried along and the telescope consequently turned about the pin $d$ as a center, and at the same time the said spindle $i$ causes a displacement of the spindle $m$ in the direction of its axis. The maximum angular positions of the telescope to the right or left are indicated, respectively, in Figs. 5 and 6 by the lines A B, and the parts for such adjustment are shown in the corresponding positions. By so selecting the pitch of the thread on the spindle $i$ that one revolution of the spindle corresponds to an angular change of one degree of the telescope the axial displacement of the spindle $m$ will likewise correspond to an angular change of one degree. By forming the graduations on the collar $p$ of the spindle $i$ and on the spindle $m$ to correspond the entire number of degrees can be read off from the graduations on the spindle $m$ and fractions thereof from the graduations on the spindle $i$. When the telescope is in its normal or central position, both graduations must of course indicate zero.

What is claimed as new is—

1. A telescope attachment for guns embodying an adjustable support, a head attached to or forming part of said support, a telescope provided with two pins about one of which said telescope can turn laterally with respect to the head, a nut engaging the second pin projecting from the telescope, means for moving said nut at substantially right angles to the longitudinal axis of the telescope, and means for permitting said second pin to turn relatively to the nut when said nut is moved rectilinearly, substantially as described.

2. A telescope attachment for guns embodying an adjustable support, a head attached to or forming part of said support, a telescope provided with two pins about one of which said telescope can turn laterally with respect to the head, while the second pin is made of substantially rectangular cross-section, a nut through which said second pin passes provided with a bush having a corresponding opening permitting movement of the said pin in the longitudinal direction of the telescope, and means for moving said nut at substantially right angles to the longitudinal axis of the telescope, substantially as described.

3. A telescope attachment for guns embodying an adjustable support, a head attached to or forming part of said support, a telescope provided with two pins about one of which said telescope can turn laterally with respect to the head, a nut through which said second pin passes, a bolt passing through said second pin transversely and preventing vertical play of the same while permitting a turning movement, and means for moving said nut at substantially right angles to the longitudinal axis of the telescope, substantially as described.

4. A telescope attachment for guns embodying an adjustable support, a head attached to or forming part of said support, a telescope provided with two pins about one of which said telescope can turn laterally with respect to the head, a nut through which the second pin passes, a threaded spindle $i$ engaging the said nut for moving the same rectilinearly and provided with an adjusting knob or handle, a second spindle $m$ placed in threaded engagement with the first spindle and provided on its outer end with graduations adapted to indicate the full turns in conjunction with the knob or handle of the first spindle, means for preventing turning of the second spindle, and graduations placed on the knob or handle of the first spindle for indicating in conjunction with a stationary mark or index the fractionary turn, substantially as described.

In testimony whereof we have hereunto set our hands in the presence of two subscribing witnesses.

HANS ALFRED VON KRETSCHMAR.
JOHN VOLLMER.

Witnesses:
WM. ESSENWEIN,
GEO. P. PETTIT.